United States Patent [19]

Tanaka et al.

[11] Patent Number: 4,862,448
[45] Date of Patent: Aug. 29, 1989

[54] DISC CARTRIDGE AND CASING THEREFOR

[75] Inventors: Kimio Tanaka; Morimasa Sasaki; Masaru Ikebe, all of Nagano, Japan

[73] Assignee: TDK Corporation, Japan

[21] Appl. No.: 83,259

[22] Filed: Aug. 6, 1987

[30] Foreign Application Priority Data

Aug. 7, 1986 [JP] Japan .......................... 61-120365[U]

[51] Int. Cl.4 .............................................. G11B 23/03
[52] U.S. Cl. .................................... 369/291; 206/312; 206/444; 360/133
[58] Field of Search ...................... 369/291, 77.2, 292; 360/133; 206/312, 444

[56] References Cited

U.S. PATENT DOCUMENTS 4,550,354 10/1985 Wakabayashi et al. ............. 360/133

FOREIGN PATENT DOCUMENTS

137965 4/1985 European Pat. Off. ........... 360/133

Primary Examiner—Steven L. Stephan
Attorney, Agent, or Firm—Steinberg & Raskin

[57] ABSTRACT

A disc cartridge and a casing therefore capable of carrying out insertion and removal of a disc with respect to the casing without separating a shutter from the disc cartridge and adversely affecting the disc, with simple operation. The casing includes a casing body constituted by an upper cover member and a lower cover member joined together to form an inner space therein which is adapted to rotatably receive therein a disc having a non-recording section formed at its outer periphery and be separable at rear ends thereof from each other. The casing also includes a pair of guides arranged on both side of a rear portion of an interior of the casing body so as to be opposite to each other. The guides permit insertion and removal of the disc with respect to the casing body to be safely accomplished along the guides through the opened rear end of the casing. The disc cartridge uses such a casing.

21 Claims, 5 Drawing Sheets

DISC CARTRIDGE AND CASING THEREFOR

BACKGROUND OF THE INVENTION

This invention relates to a disc cartridge and a casing therefor, and more particularly to a casing for a disc cartridge which is adapted to be rotatably and removably house a disc, particularly, a double-sided type hard disc therein and a disc cartridge including such a casing.

In general, a disc-type data recording carrier such as a compact disc (CD), a video disc (LD) or the like is used in a manner such that it is removed from a packing case and set in a recording and/or reproducing equipment such as a disc player.

Conventionally, it has been highly desirable to protect such a disc-type recording carrier from the environment because it is not only easily covered with dust and damaged but adversely affected due to a variation in temperature. For this purpose, a disc cartridge was proposed which is adapted to house or receive a disc in an envelope such as a tray, a casing or the like to accomplish protection of the disc.

Such an envelope for a hard disc typically comprises an upper cover member and a lower cover member fitted together to form an internal space therein in which a sliding member such as a shutter or the like for actuating a window is arranged. The internal space of the envelope is formed to have dimensions sufficient to prevent the disc from being damaged due to contact with an inner surface of the envelope during operation and transportation. For this purpose, a wall thickness of the envelope is substantially decreased, resulting in its torsional rigidity being highly reduced. This causes deformation of the envelope leading to not only damage of the hard disc, but also deterioration of function of the sliding member.

Figure 1:
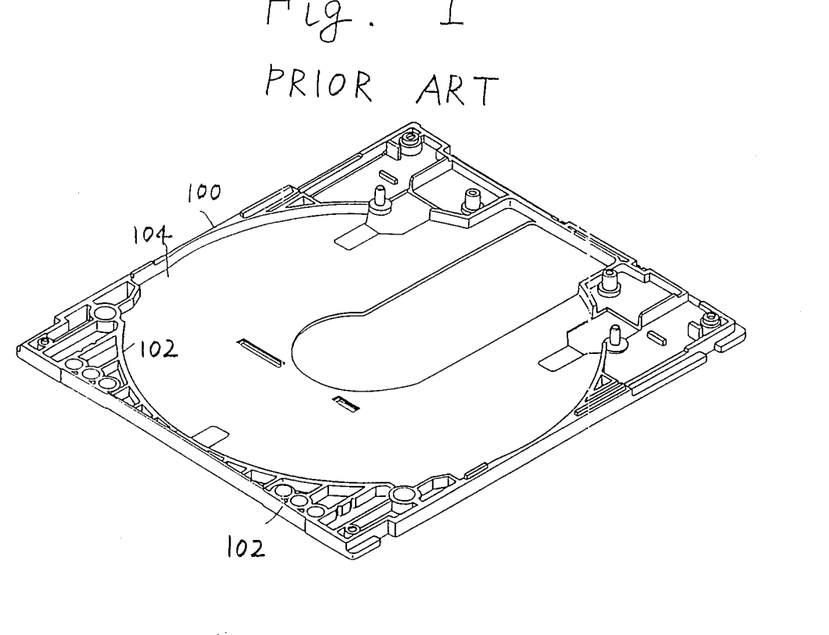
FIG. 1 is a perspective view showing a lower cover member of a casing of a conventional disc cartridge.

In order to avoid such a disadvantage, such a structure as shown in FIG. 1 was proposed. More particularly, upper and lower cover members 100 constituting an envelope or casing have reinforcing ribs 102 provided on inner surfaces 104 thereof in a symmetric manner. In FIG. 1, only the lower cover member 100 is shown for the sake of brevity. However, such a structure renders removal of a disc from the envelope troublesome, because it is required to release a shutter from the upper and lower cover members and then separate the cover members from each other for the removal.

Another important disadvantage encountered with the structure is that even when reproduction of a disc cartridge is carried out by replacement of a disc or parts of the cartridge, it is often required to dispose the whole disc cartridge due to a failure in precision and/or in view of quality control, resulting in a decrease in yields and deterioration of productivity.

Accordingly, it would be highly desirable to provide a casing for a disc cartridge which is capable of readily and safely accomplishing insertion and removal of a disc with respect to the cartridge without separating a shutter from the casing and/or disassembling the casing and safely housing the disc in the casing without damaging it, and a disc cartridge including such a casing.

SUMMARY OF THE INVENTION

Briefly speaking, in accordance with the present invention, a casing for a disc cartridge is provided. The casing includes a casing body comprising an upper cover member and a lower cover member joined together to define therein a space which is adapted to rotatably and removably house or receive therein a disc having a non-recording section and be separable at least at rear ends thereof from each other, resulting in at least a rear end of the casing body being openable. The casing also includes guide means arranged in the casing body for permitting the disc to be inserted in or removed from the casing body through the rear end of the casing body opened by separating the rear ends of the upper and lower cover members from each other while contactedly supporting the non-recording section of the disc. When the non-recording section is provided at an outer periphery of the disc, the guide means may comprise guides arranged on both sides of a rear portion of the casing body. The guides each may comprise a projection.

In accordance with the present invention, there is also provided a disc cartridge. The disc cartridge includes a casing comprising an upper cover member and a lower cover member joined together to define a space therein and be separable at least at rear ends thereof from each other, resulting in at least a rear end of the casing being openable. The disc cartridge also includes a disc rotatably and removably housed in the space of the casing and having a non-recording section. Also, the disc cartridge includes guide means arranged in the casing to permit insertion and removal of the disc with respect to the casing to be carried out along the guide means through the rear end of the casing opened by separating the rear ends of the upper and lower cover members while contactingly supporting the non-recording section of the disc. The disc cartridge may also include a shutter for operating at least one window provided at the casing to insert a disc driving element therethrough into the disc cartridge, at least one actuator arranged in the casing to releasably lock the shutter, and a disc receiver arranged in the casing and operatedly connected to the actuator to selectively hold the disc at a substantially central portion of the space of the casing in a thickness direction of the space.

Accordingly, it is an object of the present invention to provide a casing for a disc cartridge which is capable of permitting a disc to be readily inserted in or removed from the casing.

It is another object of the present invention to provide a casing for a disc cartridge which is capable of carrying out insertion and removal of a disc with respect to the casing without separating a shutter from the disc cartridge.

It is a further object of the present invention to provide a casing for a disc cartridge which is capable of accomplishing insertion and removal of a disc with respect to the casing with simple operation.

It is still another object of the present invention to provide a casing for a disc cartridge which is capable of accomplishing insertion and removal of a disc with respect to the casing without adversely affecting the disc.

It is yet another object of the present invention to provide a casing for a disc cartridge which is capable of accomplishing the above-noted objects with a simple structure.

It is still a further object of the present invention to provide a disc cartridge which is capable of permitting a disc to be readily inserted in or removed from a casing.

It is yet a further object of the present invention to provide a disc cartridge which is capable of safely housing a disc in a casing and carrying out insertion and removal of the disc with respect to the casing without adversely affecting the disc.

Still other objects and advantages of the invention will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENT

Now, a disc cartridge and a casing therefor according to the present invention will be described hereinafter with reference to the accompanying drawings.

Figure 2:
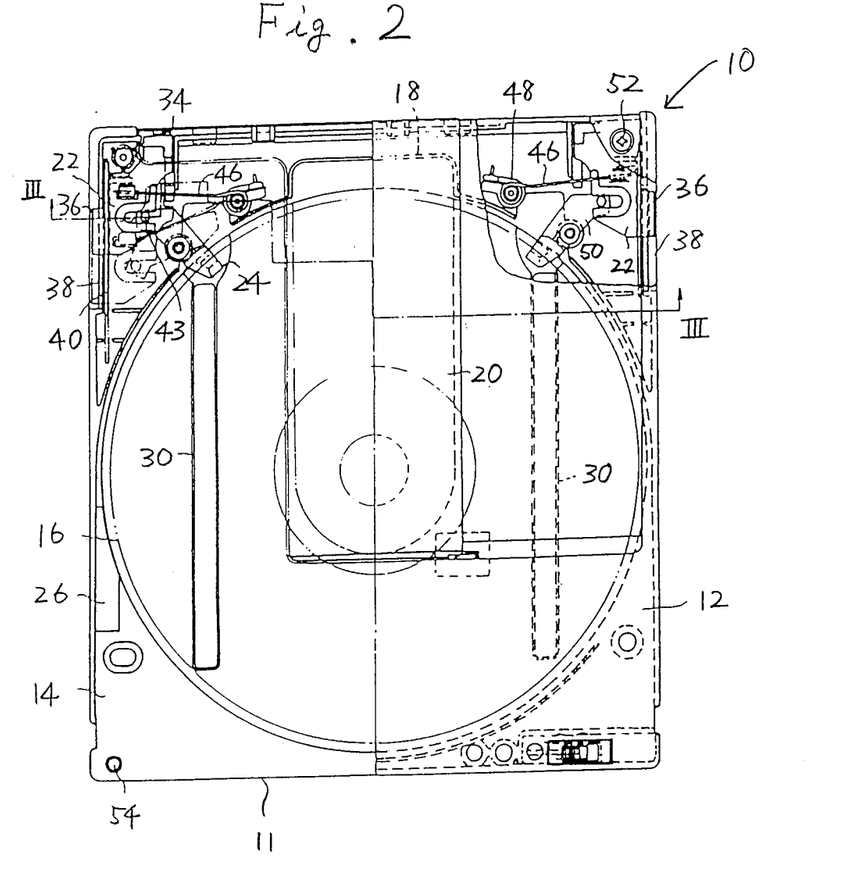
FIG. 2 is a partly cutaway plan view showing an embodiment of a disc cartridge according to the present invention.

FIG. 2 generally shows an embodiment of a disc cartridge according to the present invention.

Figure 3:
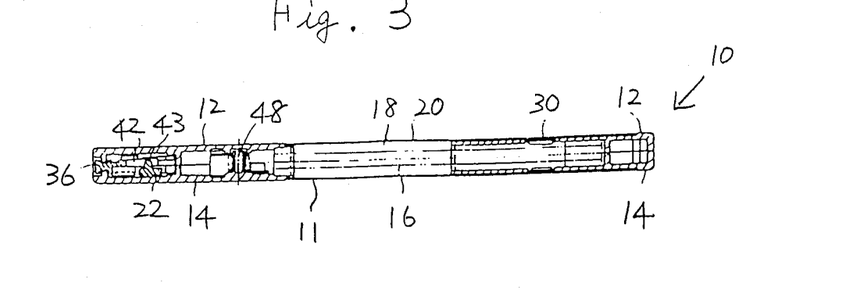
FIG. 3 is a vertical sectional view taken along line III—III of FIG. 2.
Figure 4:
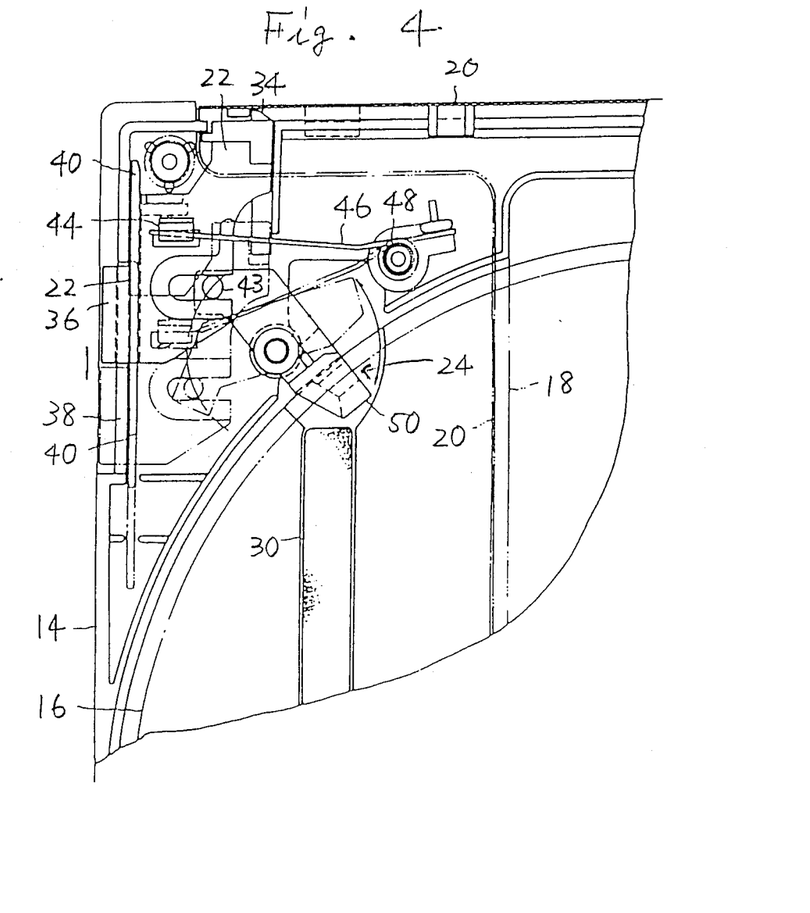
FIG. 4 is a partly enlarged view showing an actuating section of the disc cartridge shown in FIG. 2.

A disc cartridge of the illustrated embodiment, as shown in FIGS. 2 to 4, includes a casing 10, which includes a casing body 11 comprising an upper cover member 12 and a lower cover member 14 joined together so as to define an inner space therein, and a disc 16 rotatably received or housed in the so-defined space of the casing body 11 of the casing 10. The disc 16 is removably received in the casing 10 as described hereinafter. The upper and lower cover members 12 and 14 are joined in a manner to be separable at least at rear ends thereof from each other as described hereinafter. The casing body 11 is formed with at least a window 18 for inserting a disc driving element of a disc player (not shown) such as a disc head, a pick-up or the like therethrough into the casing 10. The window 18 is operated by a shutter 20. Also, the disc cartridge of the illustrated embodiment includes at least one actuator 22 arranged in the casing 10 for releasably locking the shutter 20 and at least one disc receiver 24 provided in the casing 10 and operatedly connected to or engaged with the actuator 22. In the illustrated embodiment, a pair of the actuators 22 and a pair of the disc receivers 24 are correspondingly arranged in the casing 10. The disc receivers 24 each are adapted to selectively receive a part of a peripheral portion of the disc 16 or a part of each of upper, lower and peripheral end surfaces of the disc 16 to hold the disc at a substantially central position in a thickness direction of the disc cartridge. Each of the actuators 22 is arranged to be slidable in a longitudinal direction of the cartridge indicated by arrows in FIGS. 2 and 4, and each of the disc receivers 24 is adapted to be approachably moved with respect to the disc 16 when the corresponding actuator 22 is slidably moved, so that when the shutter 20 is actuated to close the window 18, the disc receiver 24 may be engaged with a part of the disc 16 or insert therein a part of the disc to force it toward a rear end of the casing 10 while holding it at the substantially central position of the casing in the thickness direction of the casing as described above, to thereby keep it at a state of floating in the space defined in the casing 10. Whereas when the shutter 20 is actuated to open the window 18, the disc receiver 24 may be disengaged from the disc 16 to prepare the disc for engagement with the disc driving element of the disc player which is then inserted through the opened window 18 into the cartridge.

Figure 5:
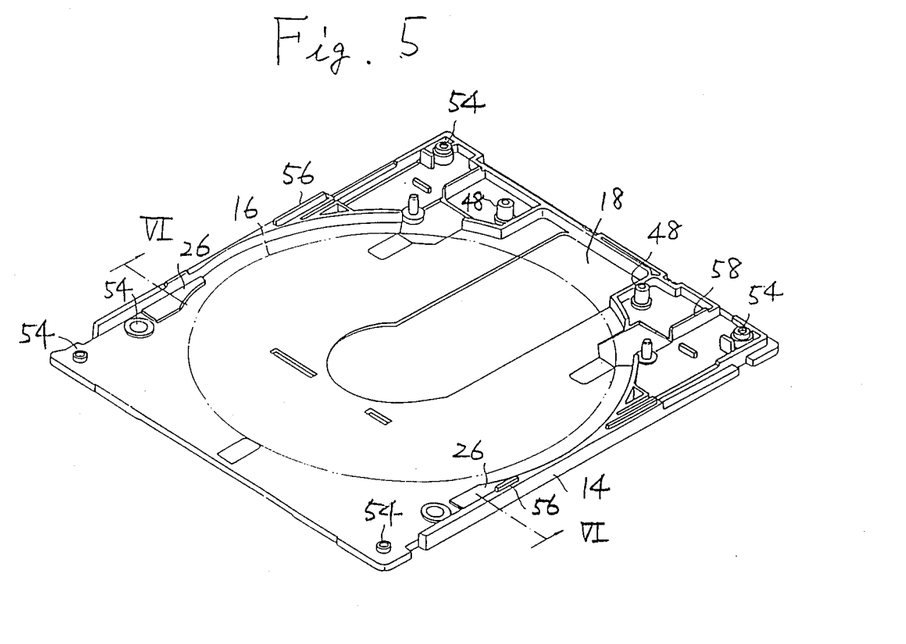
FIG. 5 is a perspective view showing a lower cover member of a casing of the disc cartridge shown in FIG. 2.

The casing 10, as shown in FIG. 5, also includes guide means 26 arranged in the casing body 11 to permit the disc 16 to be inserted in or removed from the casing 10 or casing body 11 along the guide means through the rear end of the casing 10 or casing body 11 opened by separating the rear ends of the cover members 12 and 14 from each other while contactedly supporting a non-recording section 28 of the disc 16. In the illustrated embodiment, the guide means 26 comprise a pair of guides which are positioned on both inner sides of the casing body 11 in a manner to be opposite to each other so that they may guide the disc 16 while contactingly supporting a non-recording section 28 (FIG. 6) formed at an outer periphery of the disc 16 when insertion or removal of the disc 16 with respect to the casing 10 is to be carried out through the rear end of the casing 10.

The guides 26 each may comprise a suitable means such as a projection, rail or rib provided on an inner surface of the casing 10. The guides 26 each may be formed to have a flat surface. Each of the guides may be formed to have a uniform thickness. Alternatively, it may be formed to have a thickness gradually increased toward the rear end of the casing to provide an inclined slide surface. Such construction of the guides ensures safe insertion and removal of the disc 16 through a rear gap formed between the upper cover member 12 and the lower cover member 14 by forcing open the rear end of the casing 10. Thus, the guides 26 effectively guide the disc while supporting the non-recording section 28 of the disc 16, so that insertion and removal of the disc with respect to the casing 10 may be safely carried out without damaging a recording section of the disc. Further, the guides 26 may be mounted on both inner upper and lower surfaces of the casing body 11 or any one of the surfaces so long as they can exhibit the above-noted function.

Figure 7:
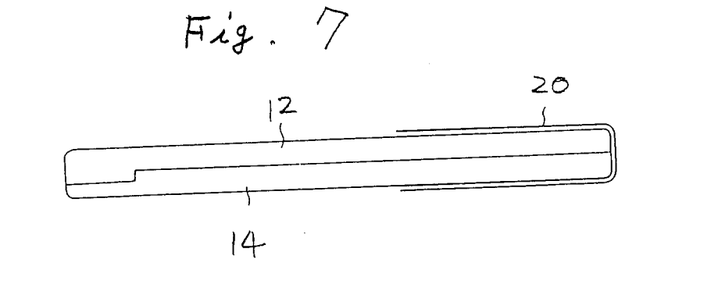
FIG. 7 is a schematic side elevation view of a casing of the disc cartridge shown in FIG. 2.
Figure 8:
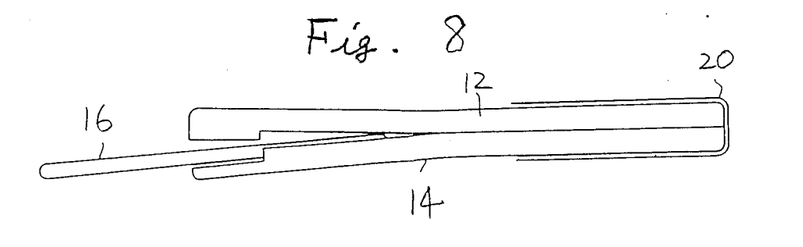
FIG. 8 is a side elevation view of the casing of FIG. 7 showing insertion or removal of a disc with respect to the casing.

In order to ensure that the guides 26 smoothly exhibits the above-noted function to cause the disc 16 to be smoothly inserted in or removed from the casing 10, it is convenient that the casing body 11 is not formed on a portion of the rear end thereof through which insertion and removal of the disc is carried out with any obstacle such as a projection, a reinforcing rib, a wall or the like, so that the insertion and removal may be smoothly accomplished without being adversely affected by the obstacle. This is particularly applied to a rear end of the inner lower surface of the casing 10. For this purpose, the illustrated embodiment wherein the casing body 11 is constituted by the upper and lower cover members 12 and 14 may be so constructed that any projection required for the casing 10 such as a wall member, support member, reinforcing member, an engagement are arranged on the upper cover member 12, whereas a portion of the lower cover member 14 against which the projection is abutted is formed to have a flat surface, resulting in smooth insertion and removal of the disc. The casing body 11 of such construction has such a configuration as shown in FIG. 7.

Also, the casing may be so constructed that when the guides 26 are provided on the lower cover member 14, the lower cover member 14 is formed to be free of the above-noted projection and a rear end wall and the upper cover member 12 fittedly engaged with the lower cover member 14 is formed with the end wall. Alternatively, the projection obstructing smooth insertion and removal of the disc carried out by opening the rear end of the casing 10 may be excluded from a portion of the inner surface of one of the cover members 12 and 14 positioned rearwardly beyond a line passing through a disc rotation axis of the cover member and perpendicular to a direction of insertion of the cartridge and arranged on the inner surface of the other cover member. Each of such constructions causes the casing body to have such a configuration as shown in FIG. 7.

Furthermore, in the disc cartridge of the illustrated embodiment, the upper cover member 12 and lower cover member 14 each are provided on the inner surface thereof with at least a sheet-like disc holding member 30, which is preferably arranged in a manner to somewhat project from the inner surface of the cover member. The disc holding member 30 may be positioned so as to be abutted against only the non-recording section 28 of the disc 16 formed at peripheral portion thereof, a central section thereof or the like. In the illustrated embodiment, each of the cover members 12 and 14 is provided with two such disc holding members 30 so as to positionally correspond to the peripheral portion 28 of the disc 16 and in a substantially symmetric manner, so that the disc 16 may be uniformly supported thereon if necessary. The disc holding member 30 may be formed of at least one material selected from the group consisting of ultra-high-molecular-weight polyethylene resin, ultra-high-molecular-weight polyethylene foam, graphite polytetrafluoroethylene, polyethylene terephthalate (PET) and polybutylene terephthalate (PBT).

The shutter 20 comprises a plate member of a substantially U-shape which is movably fitted on the casing 10 so as to be slidable along the upper and lower cover members 12 and 14.

A pair of the actuators 22, as shown in FIG. 2, are formed to be symmetric and arranged adjacent to both sides of a front portion of the casing 10 in a manner to be not only opposite to each other but symmetric along a longitudinal axis of the cartridge and slidable with respect to the casing 10. Also, the actuators 22 each serve as an actuating lever to actuate operation sections of the disc cartridge. More particularly, each of the actuators 22, as shown in FIG. 4, is provided at front end thereof with lock means 34, which comprise, in the illustrated embodiment, a hook-like member integrally formed at the front end of the actuator 22 and securely engaged with the shutter 20. The actuator 22 is also provided on one side or an outer side thereof with actuating means 36 which comprise, in the illustrated embodiment, a projection integrally formed on the outer side of the actuator 22 and outwardly extending through a horizontally extending cutout or slot 38 formed at a side wall of the casing 10. Also, the actuator 22 has cover means 40 integrally provided on the one side thereof so as to extend in a longitudinal direction thereof. The cover means 40 are formed to thoroughly cover the cutout 38 formed at the side wall of the casing 10 in a sealed manner to function as a dust protective cover for preventing dust from entering the casing 10 through the cutout 38. In addition, the actuator 22 is formed on the other side or an inner side thereof with a guide groove 42 of a substantially U-shape which constitutes movement transmission means for transmitting sliding movement of the actuator 22 to the disc receiver 24 in cooperation with a pin 43 of the disc receiver 24 fitted therein. Further, the actuator 22 is provided on an upper surface thereof with a spring bearing 44 as shown in FIG. 4 which is engaged with one end of a spring 46 held at the other end thereof on a spring holder 48 fixed on the casing 10, so that the actuator 22 may be constantly forced toward a front end of the casing.

A pair of the disc receivers 24, as shown in FIG. 2, are also formed in a manner to be symmetric. Each of the disc receivers 24 is generally formed into a lever-like shape as shown in FIGS. 2 and 4 and provided at one end thereof with a receiver body 50 of a sideways U-shape. The receiver body 50 is positioned adjacent to a peripheral portion of the disc 16 to selectively receive a part of the peripheral portion of the disc 16 therein depending upon the sliding movement of the actuator 22 and also act as an elevator for lifting the disc 16. The receiver body 50 may be provided on a portion thereof contacted with the outer periphery of the disc with an elastic member (not shown) which serves to prevent unsteadiness and damage of the disc in the receiver body 50.

In the drawings, reference numeral 52 designates a screw, 54 is a hole for the screw 52, 56 is a projection for engagement, and 58 is a partition.

Now, the manner of insertion and removal of the disc with respect to the casing in the disc cartridge of the illustrated embodiment constructed in the manner described above will be described hereinafter with reference to FIGS. 2 to 8.

Figure 6:
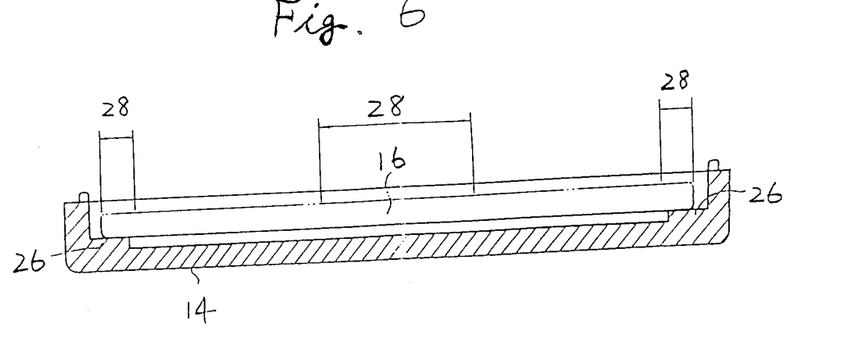
FIG. 6 is a sectional view taken along line VI—VI of FIG. 5.

First, the screws 52 arranged at the rear end of the casing 10 to securely bond the upper and lower cover members 12 and 14 together are removed from the casing. Subsequently, the rear end of the casing 10 is forced open to vertically separate the rear ends of the upper and lower cover members 12 and 14 from each other and then the disc is guided by the guides 26 so as to have access to the casing 10 through the open rear end while being supported on the the guides 26, as shown in FIG. 6. Thus, it will be noted that the insertion and removal may be easily carried out by only opening the rear end of the casing 10 without releasing the shutter 20. During the insertion and removal, the disc 16 is guided by the guides 26 while being supported thereon, so that the disc 16 may be prevented from being contacted with the casing, particularly, its inner surface. This results in the disc 16 being moved to a desired position without damaging the recording section of the disc.

As can be seen from the foregoing, in the disc cartridge of the present invention, the casing is constituted by the upper and lower cover members which are joined to be separable at least at the rear ends from each other, and the guides arranged in the casing serves to guide the disc housed or to be housed in the casing through the open rear end of the casing with respect to the casing while contactedly supporting the non-recording section of the disc. Thus, the present invention permits the disc to be inserted in or removed from the casing through the rear end of the casing without releasing or separating the shutter from the casing, so that the insertion and removal may be easily and safely carried out. Also, the guides effectively prevent the recording section of the disc from being contacted with the casing, particularly, its inner surface, so that the disc may be moved to a desired position without being damaged. Thus, repairing of the disc cartridge may be easily carried out. Further, the present invention permits a disc having a very large recording capacity and required to operate with high reliability over a long period of time to be safely held in the casing without being contacted at the recording section with the inner surface of the casing, to thereby prevent the recording section and the sliding mechanism of the cartridge from being adversely affected. Thus, the disc cartridge may be reliably operated for a long period of time with a simple structure.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A casing for a disc cartridge, comprising:
    a casing body comprising an upper cover member and a lower cover member joined together to define therein a space which is adapted to rotatably and removably house therein a disc having a non-recording section and mounted to be separable at least at rear ends thereof from each other, resulting in at least a rear end of said casing body being openable; and
    guide means arranged in said casing body for permitting insertion and removal of said disc with respect to said casing body to be carried out along said guide means through said rear end of said casing body opened by separating said rear ends of said upper and lower cover members from each other while contactingly supporting said non-recording section of said disc;
    wherein said casing body comprises a rear portion and said guide means comprise two guides arranged on at least one of inner sides of the rear portion of said casing body in a manner to be opposite to each other; and
    said non-recording section of said disc is at an outer periphery thereof.

2. A casing as defined in claim 1, wherein said guides each comprise a projection.

3. A casing as defined in claim 2, wherein said projection is provided on said lower cover member.

4. A casing as defined in claim 2, wherein said projection has a flat surface.

5. A casing as defined in claim 4, wherein said flat surface is horizontal.

6. A casing as defined in claim 4, wherein said flat surface is upwardly oblique toward said rear end of said casing body.

7. A casing as defined in claim 1, wherein said upper cover member is provided with a projection required to join said upper and lower cover members for formation of said casing body, and said lower cover member is formed to have a flat surface at a portion thereof against which said projection of said upper cover member is abuts.

8. The cartridge of claim 1, wherein front ends of said upper and lower cover members are positionable to remain fastened to one another when said rear ends are separated.

9. The casing of claim 1, wherein said guide means comprise guides being arranged on inner upper and lower surfaces of both said respective lower and upper cover members.

10. A casing for a disc cartridge, comprising:
    a casing body comprising an upper cover member and a lower cover member joined together to define therein a space which is adapted to rotatably and removably house therein a disc having a non-recording section and mounted to be separable at least at rear ends thereof from each other, resulting in at least a rear end of said casing body being openable; and
    guide means arranged in said casing body for permitting insertion and removal of said disc with respect to said casing body to be carried out along said guide means through said rear end of said casing body opened by separating said rear ends of said upper and lower cover members from each other while contactingly supporting said non-recording section of said disc,
    wherein said lower cover member is provided with said guide means and free of a rear end wall and said upper cover member is provided with said rear end wall.

11. A disc cartridge comprising:
    a casing body comprising an upper cover member and a lower cover member joined together to define a space therein and mounted to be separable at least at rear ends thereof from each other, resulting in at least a rear end of said casing body being openable;
    a disc rotatably and removably housed in said space of said casing body and provided with a non-recording section; and
    guide means arranged in said casing body to permit insertion and removal of said disc with respect to said casing body to be carried out along said guide means through said rear end of said casing body opened by separating said rear ends of said upper and lower cover members while contactingly supporting said non-recording section of said disc,
    further comprising:
    a shutter for operating at least one window provided at said casing body to insert a disc driving element therethrough into said disc cartridge;
    at least one actuator arranged in said casing body to releasably lock said shutter;
    a disc receiver arranged in said casing body and operatively connected to said at least one actuator to selectively hold said disc at a substantially central position of said space in a thickness direction of said space;

with said casing body openable at said rear end thereof without unlocking said shutter.

12. A disc cartridge, comprising:

a casing body comprising an upper cover member and a lower cover member joined together to define a space therein and mounted to be separable at least at rear ends thereof from each other, resulting in at least a rear end of said casing body being openable;

a disc rotatably and removably housed in said space of said casing body and provided with a non-recording section; and guide means arranged in said casing body to permit insertion and removal of said disc with respect to said casing body to be carried out along said guide means through said rear end of said casing body opened by separating said rear ends of said upper and lower cover members while contactingly supporting said non-recording section of said disc;

wherein said casing body comprises a rear portion and said guide means comprise two guides arranged on at least one of inner sides of said rear portion of said casing body in a manner to be opposite to each other, and said non-recording section of said disc is at an outer periphery thereof.

13. A disc cartridge as defined in claim 12, wherein said guides each comprise a projection.

14. A disc cartridge as defined in claim 13, wherein said projection is provided on said lower cover member.

15. A disc cartridge as defined in claim 13, wherein said projection has a flat surface.

16. A disc cartridge as defined in claim 15, wherein said flat surface is horizontal.

17. A disc cartridge as defined in claim 15, wherein said flat surface is upwardly oblique toward said rear end of said casing body.

18. A disc cartridge as defined in claim 12, wherein said upper cover member is provided with a projection required to join said upper and lower cover members for formation of said casing and said lower case member is formed with a flat surface at a portion against which said projection of said upper cover member abuts.

19. The cartridge of claim 12, wherein front ends of said upper and lower cover members are positionable to remain fastened to one another when said rear ends are separated.

20. The cartridge of claim 12, wherein said guide means comprise guides being arranged on inner upper and lower surfaces of both said respective lower and upper cover members.

21. A disc cartridge comprising:

a casing body comprising an upper cover member and a lower cover member joined together to define a space therein and mounted to be separable at least at rear ends thereof from each other, resulting in at least a rear end of said casing body being openable;

a disc rotatably and removably housed in said space of said casing body and provided with a non-recording section; and guide means arranged in said casing body to permit insertion and removal of said disc with respect to said casing body to be carried out along said guide means through said rear end of said casing body opened by separating said rear ends of said upper and lower cover members while contactingly supporting said non-recording section of said disc, wherein said lower cover member is provided with said guide means and free of a rear end wall, and said upper cover member is provided with said rear end wall.

* * * * *